United States Patent [19]

Ebert

[11] Patent Number: 5,797,352

[45] Date of Patent: Aug. 25, 1998

[54] PAW CLEANING LITTER MAT

[76] Inventor: Michael Adrian Ebert, R.R. #4, Thamesford, Canada, N0M 2M0

[21] Appl. No.: 576,908

[22] Filed: Dec. 22, 1995

[51] Int. Cl.$^6$ .................................................. A01K 29/00
[52] U.S. Cl. .................................................. 119/652
[58] Field of Search .............................. 119/28, 621, 622, 119/652, 165; 52/177, 179; 428/119, 167; 5/417, 420, 901, 925; 15/217, 218, 215, 238

[56] References Cited

U.S. PATENT DOCUMENTS

| | | | |
|---|---|---|---|
| 378,369 | 2/1888 | Her | 5/417 |
| 1,425,830 | 8/1922 | Bell | 5/417 |
| 2,667,657 | 2/1954 | Peterson | 15/215 |
| 3,100,312 | 8/1963 | Williams | 15/215 |
| 4,068,339 | 1/1978 | Maruyama et al. | 15/215 |
| 4,383,342 | 5/1983 | Forster | 428/167 X |

FOREIGN PATENT DOCUMENTS

93/14677  8/1993  WIPO .................................... 5/901

*Primary Examiner*—Thomas Price

[57] ABSTRACT

A paw cleaning litter mat that sits in front of a litter box which animals step on while leaving the litter box whose function is to collect the litter particles which are trapped on an animals paws. To accomplish this function the mat is comprised of a series of inclined louvers, or a plurality of protruded dots, or lots of both, and an extended flat horizontal surface along one end designed to slide underneath the litter box. The inclined slats and the protruded dots create a raised surface for animals to step on. Both the inclined slats and the protruded dots are made of a flexible rubbery material which flexes when the animal steps on them. This flexing causes the animals toes to spread apart thus releasing the litter particles stuck on their paws. These litter particles are collected in the area between the individual inclined slats and the individual protruded dots. The extended flat horizontal surface is designed to slip underneath a litter box and both eliminates any gap between the litter box and the paw cleaning litter mat, and is also used as an adjustable area which can be used to very the size of the paw cleaning mat.

13 Claims, 4 Drawing Sheets

PAW CLEANING LITTER MAT

This invention relates to a paw cleaning litter mat to be used in conjunction with litter boxes.

BACKGROUND TO THE INVENTION

A common problem with the use of litter and litter boxes with domesticated animals is the issue of litter getting trapped in the animals toes and hair which consequently when the animal leaves the litter box is tracked throughout the house.

In the past people have placed towels, carpet, etc. in front of the litter box to create a stepping mat for animals. Currently there are a few other mats which are being sold to help alleviate this problem.

These other mats are made of a rigid material. The appearance of these other mats is also very unattractive as exposed litter remains in sight.

THE INVENTION

I have conceived a paw cleaning litter mat which is designed to sit in front of a litter box which animals step on while exiting the litter box. The function of this mat is to collect the litter particles which are trapped on a animal's paws by way of evenly distributed, flexible angled louvers and/or flexible protruded dots that cover the mat.

The above mentioned mat is composed of inclined slats or louvers which create a raised surface for a domestic litter trained animal to step on. Litter particles are collected within the louvers reducing the amount of litter tracked onto the floor. The before mentioned inclined slats or louvers create two very distinct and important areas, a raised surface area for animals to walk on, and a collection area for litter to collect, which have particular advantage over the prior art. The top of the louvers are spaced apart at such a distance to create a supportive surface for the animal to walk on. The area in-between the louvers creates a collection area where the loose litter particles are collected. The mat is comprised of a flexible rubbery material which is soft on the animals paws. When the animal steps on a louver it flexes thus assisting in opening the animals paws for the litter particles to fall out. The resultant litter particles fall between the louvers into the collection area. Due to the direction and angle of the louvers these litter particles are hidden from sight. The louvers are tilted back at such an angle as to hide any litter particles in the collection area from view.

The louvers give further advantages in that the mat may be picked up from one end and carried vertically without any of the litter particles falling out of the collection area. This allows the mat to be moved easily without causing a mess on the floor. Further to this, when the mat is picked up vertically from the other end all of the litter particles will quickly and easily fall out of the collection area for easy cleaning.

The invention may also be composed of a plurality of protruded dots in place of the louvers to accomplish the same function of cleaning litter from animals paws. These plurality of protruded dots also create two very important areas, a raised surface for animals to walk on, and a collection area. The tops of the protruded dots create a surface area for the animal to walk on while the area inbetween the individual protruded dots create a collection area for the loose litter particles. Litter particles are collected between the protruded dots thus reducing the amount of litter tracked onto the floor. The protruded dots are composed of a flexible rubbery material which flexes when the animals walk on it. This is both soft on the animals paws and spreads their toes apart thus releasing litter particles from the animals paws. The resultant particles fall in-between the protruded dots to the collection area. Groups or lots of louvers and groups or lots of protruded dots can coexist adjacently on the same mat surface.

The invention also has an extended flat horizontal surface along one end of the litter mat designed to fit underneath the litter box which contains no protruded dots or louvers. This extended horizontal flat surface may be slipped underneath the litter box eliminating any gap between the litter box and the paw cleaning litter mat. This is of particular advantage over the prior art due to the fact that no litter particles will be able to collect on the floor between the litter box and the litter mat as well as ensuring the mat remains properly positioned.

The extended flat horizontal surface designed to fit underneath the litter box which contains no protruded dots or louvers give further advantage to the mat in that it creates an adjustable area which allows the litter box to be located close to or further away from the litter mat. For larger animals the adjustable area may be extended fully to create a larger litter mat and for smaller animals the adjustable area may be slipped under the litter box bringing the litter mat closer to the litter box. This allows the animal owner to vary the paw cleaning litter mat location to a specific distance from the litter box which is appropriate for their particular animal.

The invention is composed of a flexible rubbery material. This material is soft on the animals paws. This material also flexes thus aiding in spreading the animals toes apart via louvers and/or protruded dots. These soft and flexible louvers and protruded dots permits direct pressure towards physical points of the animals paws, whereby the paw is gently opened allowing the litter material to fall on to the mat.

Further objects and advantages of my invention will become apparent from a consideration of the drawings and ensuing description thereof.

DRAWINGS

The invention will now be described by way of example and reference to the accompanying drawings in which:

FIG. 2 also illustrates an animal's paw and the animal itself stepping on the litter mat;

Figure 8:
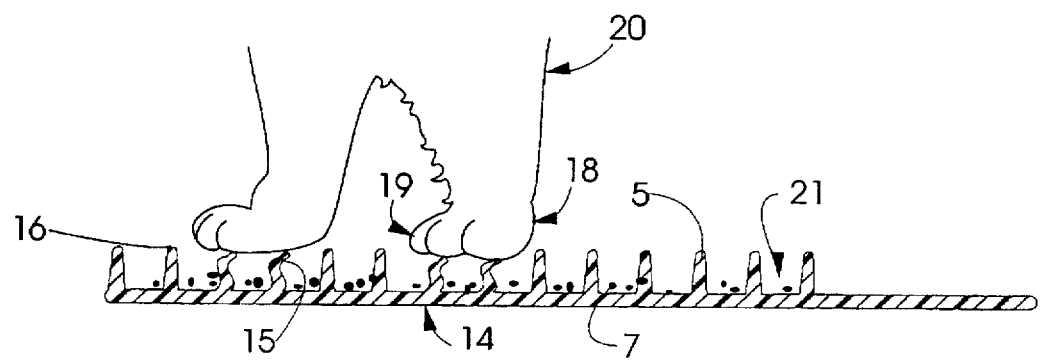
Figure 9:
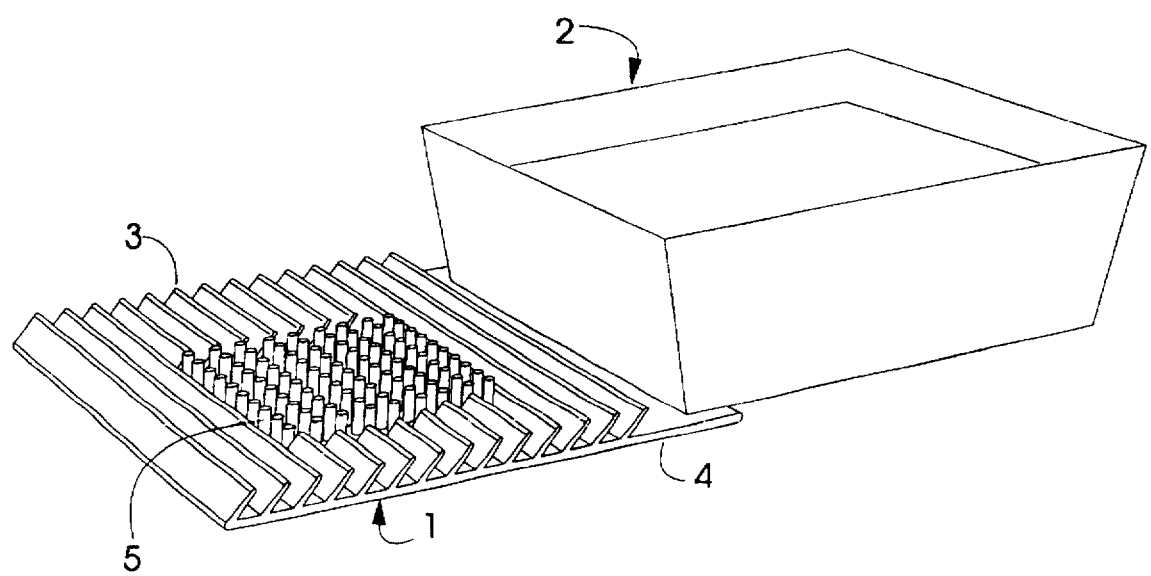

FIG. 8. shows a cross sectional view of a litter mat with the a plurality of protruded dots; FIG. 8 also illustrates an animal's paw and the animal itself stepping on the litter mat;

FIG. 9 is an alternate embodiment of the invention showing the mat having a plurality of dots and louvers.

DESCRIPTION AND OPERATION OF THE DRAWINGS

Figure 1:
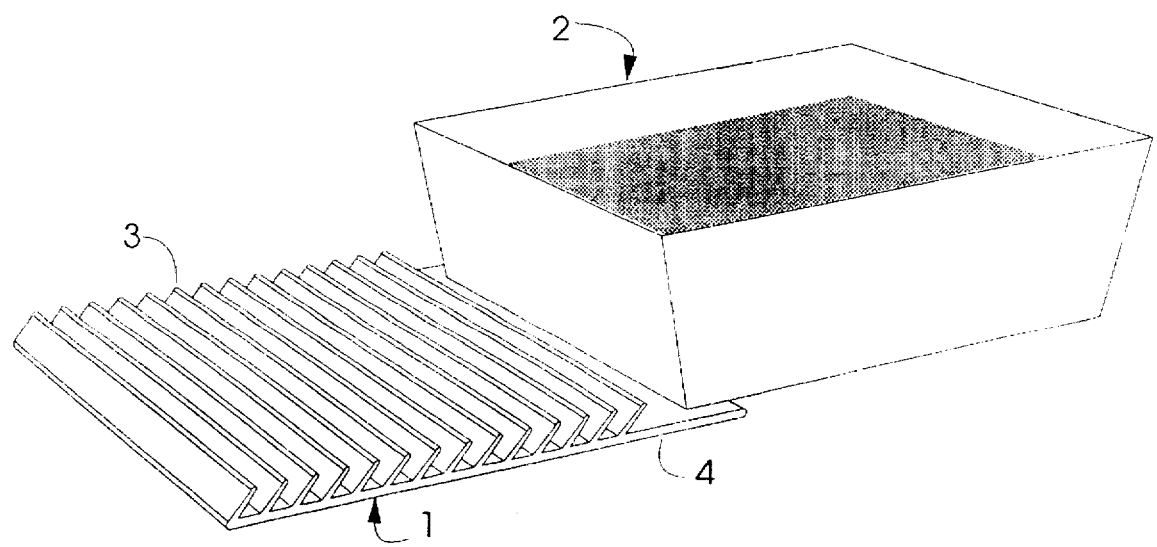
FIG. 1 shows a perspective view of the placement of a litter mat with inclined slats in front of a typical litter box.

Referring to FIG. 1 there is demonstratively shown a perspective view of the placement of a litter mat (1) in front of a typical litter box (2). Within the litter mat are inclined slats (3) which span from one side of the litter mat to the other, and an extended flat horizontal surface area (4) which slides underneath the litter box (2).

Figure 2:
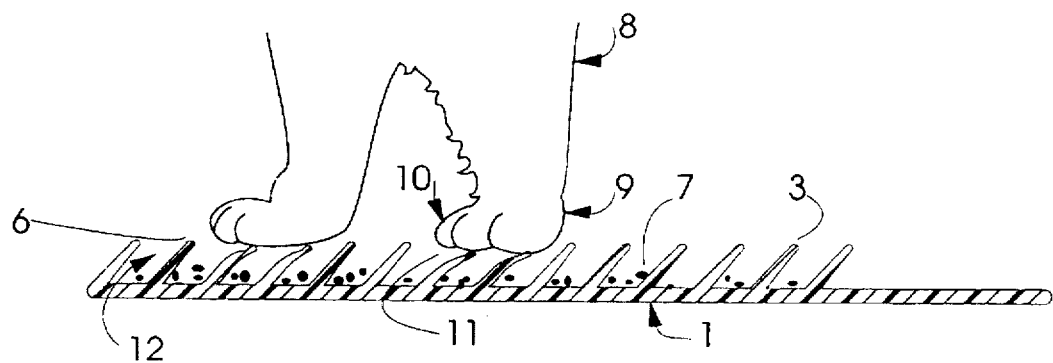
FIG. 2 shows a cross sectional view of a litter mat with the inclined slats.

Referring to the cross sectional view of FIG. 2 there is illustrated a litter mat (1) with the inclined slats (3). The inclined slats (3) are all angled in the same direction and are approximately at a 35 degree angle from the vertical but generally in the range of 0 to 50 degrees from the vertical. The inclined slats (3) create a raised surface area (6) and subsequently recessed groves (12) which are at such a height of approximately 0.30 inches but generally in the range of 0.15 to 0.50 inches, to adequately store the collected litter particles (7) and at such a width apart of approximately 0.30 inches but generally in the range of 0.15 to 0.50 inches, to still provide enough integrity (raised surface area (6)) to support the paws or feet (9) of the animal (8) when it steps on the litter mat (1). The inclined slats (3) are made of such a flexible rubbery material which allows the incline slats (3) to bend (11) thus providing a cushioning affect on the animal's paw (9) and at the same time assist in spreading the animal's toes (10) apart to release the litter particles (7) into the recessed groves (12).

Figure 3:
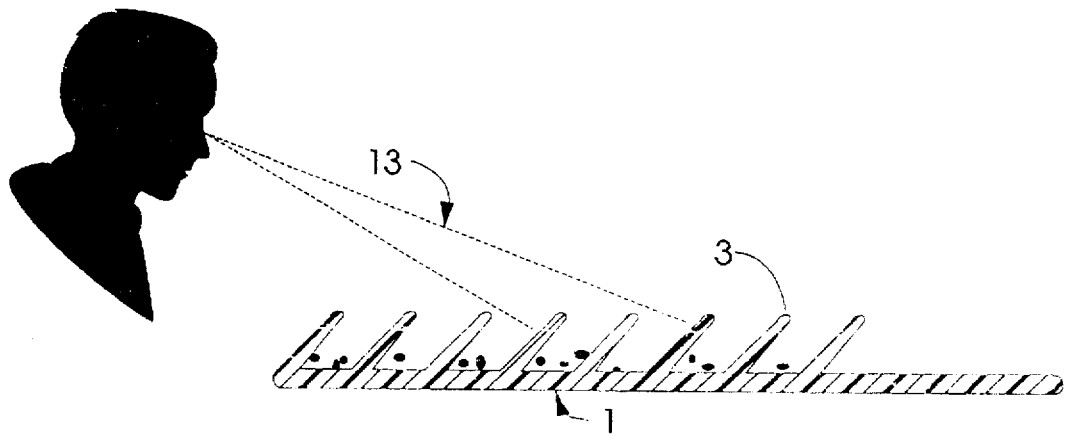
FIG. 3 shows how the litter particles are hidden from view by the inclined slats which are on the litter mat.

Referring to FIG. 3 which shows how the litter particles (7) are hidden from a view (13) by the inclined slats (3) which are on the litter mat (1).

Figure 4:
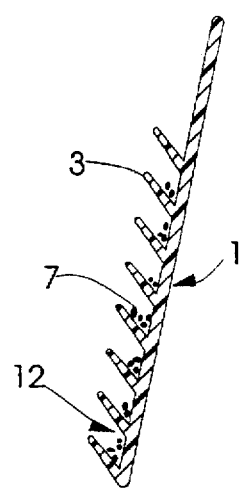
FIG. 4 shows the litter mat with inclined slats in a vertical upright carrying position.

Referring to FIG. 4 which shows the litter mat (1) in a vertical upright position illustrating how the inclined slats (3) retain and trap the litter particles (7) in the recessed groves (12) when being carried vertically upright.

Figure 5:
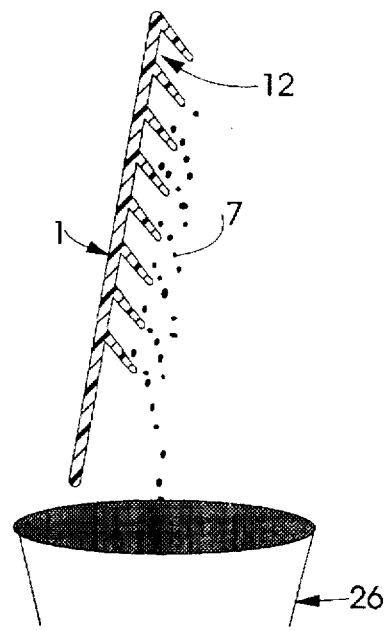
FIG. 5 shows the litter mat with inclined slats in a vertical inverted emptying position.

Referring to FIG. 5 which shows the litter mat (1) in a vertical inverted position illustrating how the litter particles (7) fall out of the recessed groves (12) when the litter mat is in a vertically inverted position into a waste collection pail (26).

Figure 6:
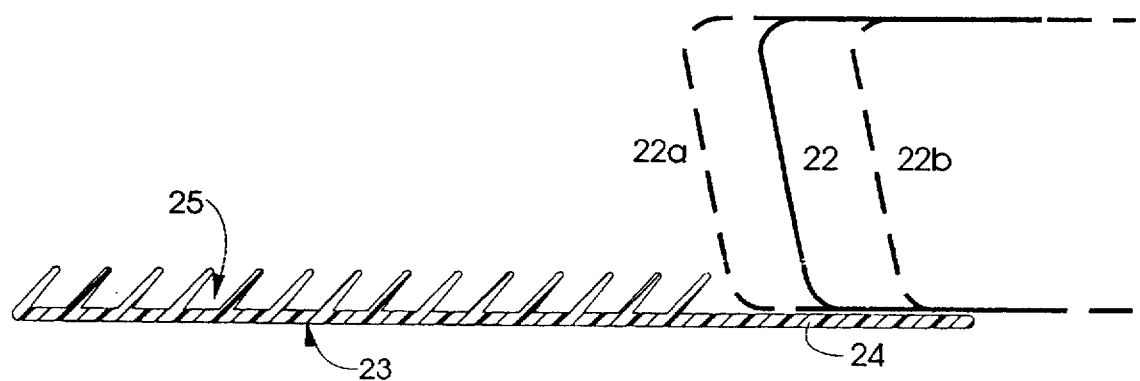
FIG. 6 shows the extended flat horizontal area which extends along one side of the litter mat.

Referring to FIG. 6 which shows the extended flat horizontal surface (24) that extends along one side of the litter mat (23) and is designed to slide underneath the litter box (22) to ensure that no gap is created between the litter box (22) and the litter mat (23). The extended flat horizontal surface (24) is an adjustable area which allows the litter box (22) to be placed closer (22a) or further away (22b) from the collection area (25) to accommodate various sized animals.

Figure 7:
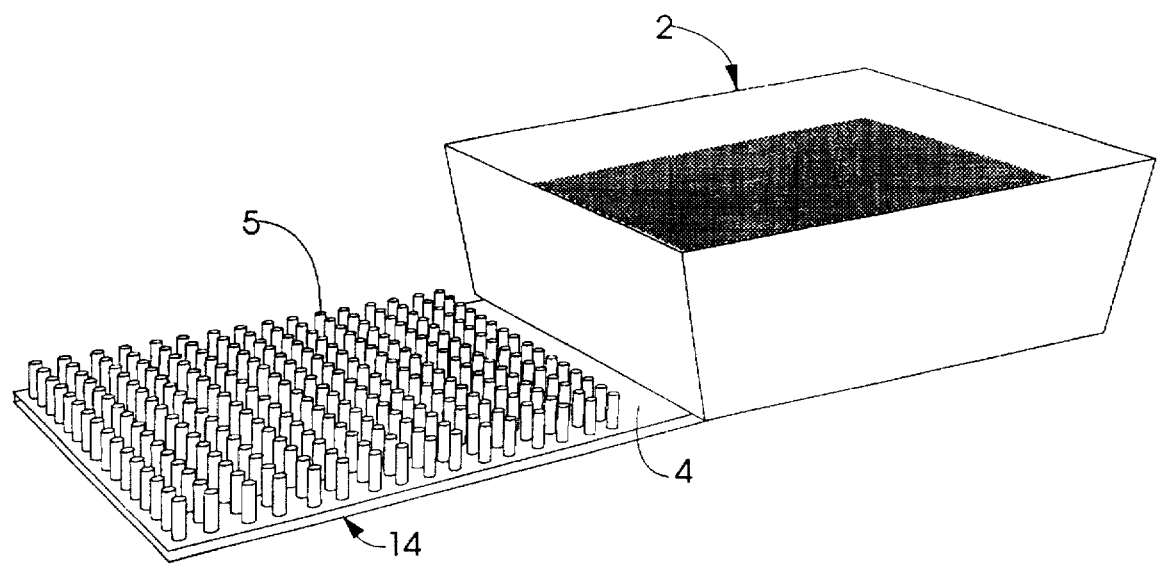
FIG. 7 shows a perspective view of the placement of a litter mat with a plurality of protruded dots in front of a typical litter box.

Referring to FIG. 7 there is demonstratively shown a perspective view of the placement of a litter mat (14) in front of a typical litter box (2). Within the litter mat are a plurality of protruded dots (5), and an extended flat horizontal surface area (4) which slides underneath the litter box (2).

Referring to the cross sectional view of FIG. 8 there is illustrated a litter mat (14) with a plurality of protruded dots (5). The plurality of protruded dots (5) with a diameter of approximately 0.085 inches but generally in the range of 0.050 to 0.130 inches, create a raised surface area (16) and subsequently recessed groves (21) which are at such a height of approximately 0.30 inches but generally in the range of 0.15 to 0.50 inches, to adequately store the collected litter particles (7) and at such a width apart to still provide enough integrity (raised surface area (16)) to support the paws or feet (18) of the animal (20) when it steps on the litter mat (14). The plurality of protruded dots (5) are made of such a flexible rubbery material which allows the protruded dots (5) to bend (15) thus providing a cushioning affect on the animal's paw (18) and at the same time assist in spreading the animal's toes (19) apart to release the litter particles (7) into the recessed groves (21).

While the above description contains many specificities, these should not be construed as limitations on the scope of the invention, but rather as an exemplification of one preferred embodiment thereof. Many other variations are possible, for example, referring to FIG. 9 which show the paw cleaning litter mat (1) that contains both groups of protruded dots (5) as well as groups of inclined slats (3). The groups of inclined slats (3) and the groups protruded dots (5) can be in any proportion to each other so long as the combination of both is sufficient to create a collection area (12.21) as well as a raised surface (6.16). Accordingly, the scope of the invention should be determined not by the embodiment illustrated, but by the appended claims and their legal equivalents.

I claim:

1. A mat that sits in front of a litter box which animals step on while exiting the litter box whose function is to collect the litter particles which are trapped on the animals paws comprising of a series of evenly distributed inclined raised louvers spaced at such a distance between the louvers to permit a supportive walking surface for an animal yet enough height and distance apart for the collection of litter particles between each louver.

2. A mat as claimed in claim 1, wherein the inclined louvers are made of a flexible rubbery material.

3. A mat as claimed in claim 2, wherein the louvers are approximately at a 35 degree angle from the vertical but generally in the range of 0 to 50 degrees from the vertical.

4. A mat as claimed in claim 2, wherein the louvers are approximately 0.30 inches in height but generally in the range of 0.15 to 0.50 inches and approximately 0.30 inches apart but generally in the range of 0.15 to 0.50 inches.

5. A mat that sits in front of a litter box which animals step on while exiting the litter box whose function is to collect the litter particles which are trapped on the animals paws comprising of a plurality of protruded dots evenly distributed at such a distance between the protruded dots to permit a supportive walking surface for an animal yet enough height and distance apart for the collection of litter particles between each protruded dot.

6. A mat as claimed in claim 5, wherein the protruded dots are made of a flexible rubbery material.

7. A mat as claimed in claim 6, wherein the protruded dots have a diameter of approximately 0.085 inches but generally in the range of 0.050 to 0.130 inches and are approximately 0.30 inches in height but generally in the range of 0.15 to 0.50 inches and approximately 0.30 inches apart but generally in the range of 0.15 to 0.50 inches.

8. A mat that sits in front of a litter box which animals step on while exiting the litter box whose function is to collect the litter particles which are trapped on the animals paws comprising of groups or lots of inclined louvers with adjacent groups or lots of protruded dots wherein the inclined louvers are evenly distributed at such a distance between the louvers to permit a supportive walking surface for an animal yet enough height and distance apart for the collection of litter particles between each louver and wherein adjacent groups or lots of protruded dots evenly distributed at such a distance between the protruded dots to permit a supportive walking surface for an animal yet enough height and distance apart for the collection of litter particles between each protruded dot.

9. A mat as claimed in claims 8, wherein the inclined louvers and protruded dots are made of a flexible rubbery material.

10. A mat as claimed in claim 9, wherein the louvers are approximately at a 35 degree angle from the vertical but generally in the range of 0 to 50 degrees from the vertical, the protruded dots have a diameter of approximately 0.085 inches but generally in the range of 0.050 to 0.130 inches and the louvers and protruded dots are approximately 0.30 inches in height but generally in the range of 0.15 to 0.50 inches and approximately 0.30 inches apart but generally in the range of 0.15 to 0.50 inches.

11. A mat that sits in front of a litter box which animals step on while exiting the litter box whose function is to collect the litter particles which are trapped on the animals paws comprising of a series of evenly distributed inclined raised louvers spaced at such a distance between the louvers to permit a supportive walking surface for an animal yet enough height and distance apart for the collection of litter particles between each louver, wherein the inclined louvers are made of a flexible rubbery material and wherein the mat has an extended horizontal flat surface along one side of the mat containing no louvers which can slide underneath the litter box to prevent litter from falling into a gap between the litter box and the mat.

12. A mat that sits in front of a litter box which animals step on while exiting the litter box whose function is to collect the litter particles which are trapped on the animals paws comprising of a plurality of protruded dots evenly distributed at such a distance between the protruded dots to permit a supportive walking surface for an animal yet enough height and distance apart for the collection of litter particles between each protruded dot, wherein the protruded dots are made of a flexible rubbery material and wherein the mat has an extended horizontal flat surface along one side of the mat containing no protruded dots which can slide underneath the litter box to prevent litter from falling into a gap between the litter box and the mat.

13. A mat that sits in front of a litter box which animals step on while exiting the litter box whose function is to collect the litter particles which are trapped on the animals paws comprising of groups or lots of inclined louvers with adjacent groups or lots of protruded dots wherein the inclined louvers are evenly distributed at such a distance between the louvers to permit a supportive walking surface for an animal yet enough height and distance apart for the collection of litter particles between each louver and wherein adjacent groups or lots of protruded dots evenly distributed at such a distance between the protruded dots to permit a supportive walking surface for an animal yet enough height and distance apart for the collection of litter particles between each protruded dot, wherein the inclined louvers and protruded dots are made of a flexible rubbery material and wherein the mat has an extended horizontal flat surface along one side of the mat containing no louvers or protruded dots which can slide underneath the litter box to prevent litter from falling into a gap between the litter box and the mat.

* * * * *

REEXAMINATION CERTIFICATE (4545th)

United States Patent
Ebert

(10) Number: US 5,797,352 C1
(45) Certificate Issued: Mar. 26, 2002

(54) PAW CLEANING LITTER MAT

(75) Inventor: Michael Adrian Ebert, R.R. #4, Thamesford (CA), N0M 2M0

(73) Assignee: Michael Adrian Ebert, Thamesford (CA)

Reexamination Request:
No. 90/005,213, Dec. 18, 1998

Reexamination Certificate for:
Patent No.: 5,797,352
Issued: Aug. 25, 1998
Appl. No.: 08/576,908
Filed: Dec. 22, 1995

(51) Int. Cl.$^7$ ............................................. A01K 29/00
(52) U.S. Cl. ....................................... 119/652; 119/711
(58) Field of Search ............................... 119/161, 165, 119/166, 167, 168

(56) References Cited

U.S. PATENT DOCUMENTS

| | | | |
|---|---|---|---|
| 34,001 A | * | 12/1861 | Mayall |
| 348,782 A | * | 9/1886 | Sawyer |
| 1,457,152 A | * | 5/1923 | Disch et al. |
| 2,021,522 A | * | 11/1935 | Schacht |
| 2,082,928 A | * | 6/1937 | Wilhelmy |
| 2,665,664 A | * | 1/1954 | Benjamin |
| 2,667,654 A | * | 2/1954 | Peterson |
| 2,680,698 A | * | 6/1954 | Schnee |
| 2,701,890 A | * | 2/1955 | Moor, Jr. |
| 2,795,001 A | * | 6/1957 | Wood |
| 3,100,312 A | * | 8/1963 | Williams |
| 4,068,339 A | * | 1/1978 | Maruyama et al. |
| 4,280,729 A | * | 7/1981 | Morawski |
| 4,952,434 A | * | 8/1990 | Rumsey |

OTHER PUBLICATIONS

The May 1993 Pet Dealer Article p. 70.*

* cited by examiner

*Primary Examiner*—Thomas Price

(57) ABSTRACT

A paw cleaning litter mat that sits in front of a litter box which animals step on while leaving the litter box whose function is to collect the litter particles which are trapped on an animals paws. To accomplish this function the mat is comprised of a series of inclined louvers, or a plurality of protruded dots, or lots of both, and an extended flat horizontal surface along one end designed to slide underneath the litter box. The inclined slats and the protruded dots create a raised surface for animals to step on. Both the inclined slats and the protruded dots are made of a flexible rubbery material which flexes when the animal steps on them. This flexing causes the animals toes to spread apart thus releasing the litter particles stuck on their paws. These litter particles are collected in the area between the individual inclined slats and the individual protruded dots. The extended flat horizontal surface is designed to slip underneath a litter box and both eliminates any gap between the litter box and the paw cleaning litter mat, and is also used as an adjustable area which can be used to very the size of the paw cleaning mat.

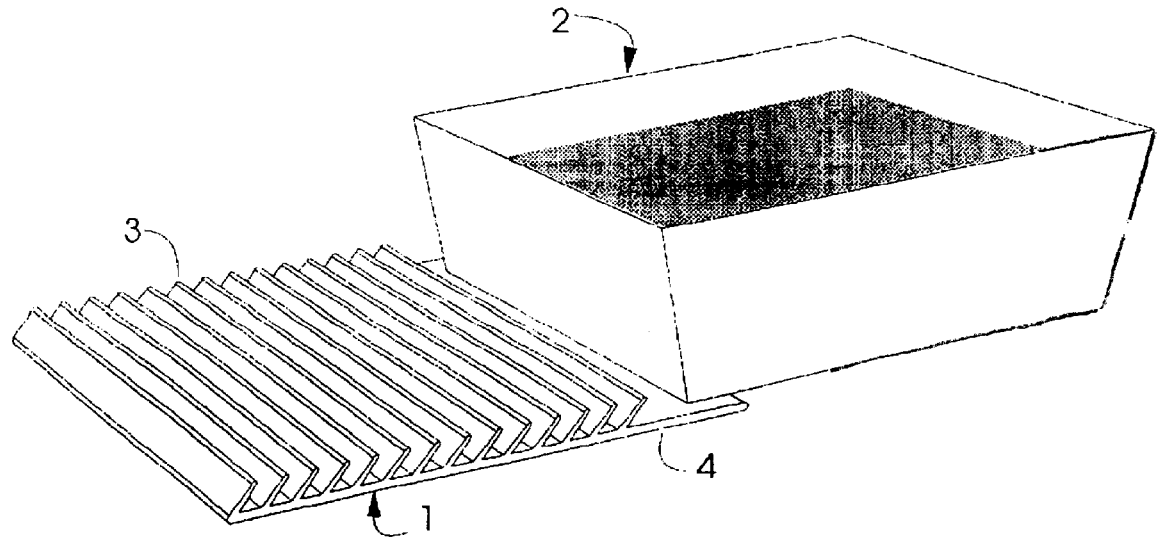

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–4, 8–11 and 13 is confirmed.

Claims 5–7 and 12 are cancelled.

* * * * *